United States Patent [19]

Statton et al.

[11] Patent Number: 4,711,910

[45] Date of Patent: * Dec. 8, 1987

[54] PREPARATION OF FIRE RETARDANT FLEXIBLE POLYESTER BASED POLYURETHANE FOAMS HAVING REDUCED DISCOLORATION AND SCORCH

[75] Inventors: Gary L. Statton, West Chester; James M. Gaul, Exton, both of Pa.

[73] Assignee: Atlantic Richfield Company, Los Angeles, Calif.

[ * ] Notice: The portion of the term of this patent subsequent to Nov. 4, 2003 has been disclaimed.

[21] Appl. No.: 922,629

[22] Filed: Oct. 24, 1986

[51] Int. Cl.$^4$ .................. C08G 18/14; C08G 18/16; C08G 18/30
[52] U.S. Cl. .................. 521/107; 521/130; 521/131; 521/112; 521/127; 521/129
[58] Field of Search .............. 521/130, 131, 107, 112, 521/127, 129

[56] References Cited

U.S. PATENT DOCUMENTS 3,772,218  11/1973  Lamplugh et al. .................. 521/99
4,071,482  1/1978  Hopkins, Jr. et al. .............. 521/131
4,621,105  11/1986  Statton et al. ..................... 521/133

OTHER PUBLICATIONS

Saunders and Frisch, *Polyurethane Chemistry and Technology*, John Wiley & Sons, N.Y., 1964, pp. 1-3, 5-6, and 195, TP986P6S3.

*Primary Examiner*—Harold D. Anderson
*Assistant Examiner*—Dennis R. Daley
*Attorney, Agent, or Firm*—Delbert E. McCaslin

[57] ABSTRACT

Fire retardant flexible polyurethane foams are prepared with reduced scorch and discoloration by the addition of a stabilizing amount of from about 1 to about 12 parts by weight of a cyclic alkylene carbonate to the formulation, based on the weight of the polyester polyol employed, without affecting the fire retardancy of the foam product.

11 Claims, No Drawings

PREPARATION OF FIRE RETARDANT FLEXIBLE POLYESTER BASED POLYURETHANE FOAMS HAVING REDUCED DISCOLORATION AND SCORCH

BACKGROUND OF THE INVENTION

This application is related to co-pending application Ser. No. 767,442 filed Aug. 20, 1985 now U.S. Pat. No. 4,621,105 which discloses the preparation of fire retardant flexible polyurethane foams having reduced discoloration and scorch which are based on polyether polyols.

Generally, flexible polyurethane foams are detrimentally affected by a discoloration and scorch during the production thereof. Various antioxidant compositions and methods for the use thereof in inhibiting color and/or scorch tendencies in polyurethane foams are known in the art. U.S. Pat. Nos. 3,567,664, 4,007,230, 4,265,783 and 4,444,676 describe various antioxidants and the stabilization of polyurethane foams. When fire retardant compounds are employed in the formulations to prepare flexible polyurethane foams with reduced flammability, discoloration and scorch of the foam are known to increase. As described for example in U.S. Pat. No. 4,143,129, a further increase in antioxidants are required to overcome this phenomenon in an attempt to stabilize and reduce the discoloration and scorch to acceptable levels. There is no teaching in the prior art of the effect obtained to stabilize and reduce discoloration and scorch in fire retardant flexible polyurethane foams with the cyclic alkylene carbonate of the instant invention.

SUMMARY OF THE INVENTION

This invention relates to the novel method for the stabilization and reduction of discoloration and scorch in fire retardant flexible polyester based polyurethane foams. Specifically the invention relates to a method for stabilizing and reducing the discoloration and scorch in fire retarded flexible polyester based polyurethane foams by the addition, to the formulation used in preparation of the foam, of from about 1 to about 12 parts by weight of a cyclic alkylene carbonate based on the weight of the polyester polyol employed in the formulation.

It is an object of this invention to provide a novel method for the preparation of a fire retarded flexible polyurethane foam having reduced discoloration and scorch without adversely affecting the flammability characteristics of the foam.

These and other objects and advantages of this invention will become apparent from the description of the invention which follows and from the claims.

DETAILED DESCRIPTION OF THE INVENTION

According to the present invention, fire retardant flexible polyester based polyurethane foams are stabilized to provide a reduction in discoloration and scorch by incorporating in the formulation to produce the foam, from about 1 to about 12 parts by weight of a cyclic alkylene carbonate based on the weight of polyester polyol employed in the formulation, said carbonate having the formula

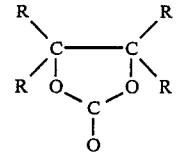

wherein R is independently hydrogen, an alkyl group having from 1 to 8 carbon atoms an alkenyl group having from 1 to 8 carbon atoms or a phenyl group.

Preparation of the fire retardant polyurethane foams which includes the stabilizing cyclic alkylene carbonate of the present invention may be accomplished by any of the standard prior art procedures. Typical polyurethane foam preparation is disclosed for example in U.S. Pat. No. 3,567,664. Preparation includes the prepolymer, quasi-prepolymer or one shot methods. Generally the polyester polyols are reacted with an organic polyisocyanate in the presence of a catalyst, a surfactant and a blowing agent as well as the stabilizing and various other additions such as fillers, dyes, etc., if desired. In order to obtain the optimum benefit of the stabilizing cyclic alkylene carbonate, it is preferably admixed with the polyester polyol prior to employing the polyol with the isocyanate in the preparation of the urethane foams. However, the cyclic carbonate may be added alone or with other reactants such as the isocyanate when preparing the polyurethane foam. The proportion of the cyclic carbonate stabilizer when using the latter technique, would be based upon the proportion of polyester polyol employed.

The cyclic alkylene carbonates which may be employed as stabilizers to reduce discoloration and scorch in fire retarded flexible polyurethane foams in amounts of from about 1 to about 12 preferably 2 to 6 weight percent based on 100 parts of the polyester polyol include for example ethylene carbonate, propylene carbonate, 1,2-butylene carbonate, 2,3-butylene carbonate, styrene carbonate, vinyl ethylene carbonate, phenyl ethylene carbonate, mixtures thereof and the like. Liquid alkylene carbonates are preferred, however, solid or semisolid carbonates may be used if essentially liquified via the polyether polyol, isocyanate or other liquid carbonates. As an example, ethylene carbonate which is a solid at room temperature may be employed in admixture with propylene carbonate in which it is soluble. Mixtures may range, for example, from about 5 to 80 weight percent ethylene carbonate to between 95 and 20 weight percent propylene carbonate.

The flame or fire retardant compounds which may be employed in the preparation of the scorch and discoloration stabilized flexible polyurethane foams according to the invention are generally the halogenated alkyl phosphate esters and the poly (haloethyl-alkyoxy) phosphoric acid esters. Representative fire retardant include for example dibromoneopentyl alcohol, tricresylphosphate, triethylphosphate, tris (2-chloroethyl) phosphate, tris (chloropropyl) phosphate, tris (dichloropropyl) phosphate, tris (dibromopropyl) phosphate and the like, or mixtures thereof, tetrakis (2-chloroethyl) ethylene diphosphate (Sold commercially under the trademark "Thermolin 101" by Olin Chemical), tetrakis [2-chloroethyl] bis-2 (2-chloromethyl) propylene diphosphate and oligomers thereof (Sold commercially under the trademark "Fyrol EFF" by Stauffer Chemical Company). In general between about 2 and about 25 preferably 5 to 15 weight percent of the flame retardant is employed based on 100 parts of the polyester polyol.

The polyester polyols used in this invention include those polyester polyols used to prepare flexible foams. The "flexible" polyester polyols have a hydroxyl number of from about 25 to 75 and a functionality of 2 to 3. The polyols may be diols or triols derived from polyvalent alcohols and dicarboxylic acids such as, for example, adipic acid, succinic acid, glutaric acid, undecandioic and dodecanedioic acids, phthalic and terephthalic acids, and the like, and may be, for example, made with diethylene glycol and triethylene glycol or mixtures thereof and glycerine. Molecular weight will generally range from about 1000 to 4500. Preferably the higher molecular weight polyester polyols are employed. Typical polyester polyols used to prepare a flexible polyurethane foam are sold commercially for example, as "Multrathane R-68", "Multrathane-R16" and "Multrathane E-606" (Mobay Chemical Company) having hydroxyl number ranges of 45–52, 41–47, and 57–63 and viscosities of approximately 850, 800 and 1050 at 73° C., respectively.

The organic di- or polyisocyantes employed as reactants in the present invention include aliphatic, alicylic and aromatic polyisocyanates characterized by containing two or more isocyanate (NCO) groups per molecule. Such polyisocyanates include the diisocyanates and higher functionally isocyanates, particularly the aromatic isocyanates. Mixtures of polyisocyanates may be used which for example are the crude mixtures of di- and higher functional polyisocyanates produced by phosgenation of anilineformaldehyde condensates or as prepared by the thermal decomposition of the corresponding carbamates dissolved in a suitable solvent as described in U.S. Pat. Nos. 3,962,302 and 3,919,279, both known as crude MDI. The isocyanates may contain impurities or additives such as carbodiimides, isocyanurate groups, urea, hydrolyzable chlorides and biurets. Illustrative of such di- or polyisocyanates which may be employed include, for example, toluene-2,4- and 2,6-diisocyanate or mixtures thereof, diphenylmethane diisocyanate 4,4' and 2,4' isomers or mixtures thereof, napthalene-1,5-diisocyanate, 3,3'-dimethyl diphenylmethane-4,4'-diisocyanate, triphenylmethane triisocyanate, hexamethylene diisocyanate, 3,3'-ditolylene-4,4'-diisocyanate, butylene-1,4-diisocyante, octylene-1,8-diisocyanate, 4-chloro-1,3-phenylene diisocyanate, 1,4-, 1,3- and 1,2-cyclohexylene diisocyanates and in general the polyisocyanates disclosed in U.S. Pat. No. 3,577,358. The preferred polyisocyanates are mixtures of toluene-2,4- and 2,6-diisocyanates and the diphenylmethane diisocyanate 2,4' and 4,4' isomers including the 2,2' isomer.

The tertiary amine catalysts which may be employed in amounts of from about 0.1 to about 5.0 preferably 0.2 to 3.0 parts by weight based on 100 parts of the polyester polyol mixture include, for example, N-methyl morpholine, dimethylaminocyclohexane, triethylenediamine, bis (2-dimethylaminoethyl) ether sold commercially as "NIAX A-1" by Union Carbide Company, dimethylethanolamine, trimethylaminopropylethanolamine, trimethylhydroxyethyl ethylenediamine and 1,8diazabicyclo[5.4.0] undec-7-ene and the like. Metal salts such as stannous octoate, lead octoate, dibutyltin dilaurate sold commercially as "T-12" by Air Products Company as well as mixtures of the tertiary amines and organic salts may also be employed as catalysts. The metal salts may be employed in amounts of from about 0.01 to about 2.5 parts by weight based on the polyester polyol.

The preferred blowing agent for use in the instant invention is $CO_2$ which is generated by the addition of water in amounts of from about 1 to about 9 preferably 2 to 6 parts by weight based on the weight of the polyol and which reacts with the isocyanate. Instead of water alone, fluorocarbons having a boiling point below about 60° C. mixed with water as well as methylene chloride mixed with water may also be employed. Typical mixtures of organic blowing agents and water may be from 30 to 40 parts water and up to 40 parts organic blowing agent. The fluorocarbons which may be used include, for example, difluorodichloromethane, difluorochloromethane, trichlorofluoromethane, difluoroethane, difluoropropane, difluorochloroethane, trifluorotrichloroethane, and the like.

The silicone surfactant which act to compatibilize and stabilize the foam reaction mixture is added to the formulation in amounts of from about 1 to about 3 parts by weight per 100 parts of polyester polyol mixture. These surfactants are organo-polysiloxanes such as the polyalkylene oxide siloxane block copolymers which may contain hydrolyzable SiOC groups such as Union Carbide Corporation's "L-520", "L-560", "L-5750" or "L-6202".

The following examples are provided to illustrate the invention in accordance with the principles of this invention, including examples of a comparative nature, but are not to be construed as limiting the invention in any way except as indicated by the appended claims.

Discoloration and foam scorch were determined by preparing low density flexible foams with and without stabilizing cyclic carbonate which were then subjected to a scorch test. After mixing all the required foam ingredients, the mixture was immediately poured into a $10'' \times 10'' \times 5''$ box and allowed to rise. After 5 minutes from the start of the isocyanate mixing, the polyurethane foam was placed into a preheated microwave oven for a specified time at 30% power setting. At the end of the microwave treatment, the foam was allowed to cure for 24 hours at room temperature. The foam was then cut parallel to the foam rise and discoloration and scorch measurements taken by use of a Gardner XL-10 Tristimulus Colorimeter as described in "A Rapid Predictive Foam Test For Urethane Foam Scorch" by M. J. Reali and B. A. Jacobs in the Journal of Cellular Plastics Nov./Dec. 1979 (Volume 15, No. 6). Greater discoloration values signify more discoloration and scorch. All numerical values in the examples are parts by weight unless otherwise noted.

| EXAMPLES 1 to 4 | | | | |
|---|---|---|---|---|
| | Example No. | | | |
| Formulation | 1 | 2 | 3 | 4 |
| Polyester Polyol (Multrathane) R-68 | 100 | 100 | 100 | 100 |
| Water | 4 | 4 | 4.5 | 4.5 |
| n-Methyl Morpholine | 0.425 | 0.425 | 0.425 | 0.425 |
| Dibutyl Tin Dilaurate (T-12) | 0.2 | 0.2 | 0.25 | 0.25 |
| Surfactant "L-6202" | 1.1 | 1.1 | 1.0 | 1.0 |
| Fire retardant | | | | |
| "Thermolin 101" | 10 | 10 | 0 | 0 |
| "Fyrol EFF" | 0 | 0 | 12 | 12 |
| Propylene Carbonate | 0 | 4 | 0 | 4 |
| Toluene Diisocyanate | | | | |
| Index[1] | 110 | 110 | 105 | 105 |
| Discoloration Value[2] | 41.9 | 35.5 | 41.0 | 35.3 |
| California Flammability 117 | pass | pass | — | — |

-continued

EXAMPLES 1 to 4

| Formulation | Example No. | | | |
|---|---|---|---|---|
| | 1 | 2 | 3 | 4 |
| Burn Test (Part A) | | | | |

(1) Ratio of NCO:OH groups
(2) After Microwave Treatment for 6 minutes at 30% power The results of Examples 1–4 show that addition of the propylene carbonate reduces the intensity of discoloration and scorch and does not adversely affect the flammability results of the polyurethane foam.

EXAMPLES 5 to 8

| Formulation | Example No. | | | |
|---|---|---|---|---|
| | 5 | 6 | 7 | 8 |
| Polyester Polyol (Multrathane) E-606 | 100 | 100 | 100 | 100 |
| Water | 4 | 4 | 4 | 4 |
| n-Methyl Morpholine | 0.425 | 0.425 | 0.425 | 0.425 |
| Dibutyl Tin Dilaurate (T-12) | 0.2 | 0.2 | 0.2 | 0.2 |
| Surfactant "L-5750" | 1.1 | 1.1 | 1.1 | 1.1 |
| Fire retardant | | | | |
| "Thermolin 101" | 10 | 10 | 10 | 10 |
| Propylene Carbonate | 0 | 0 | 2 | 8 |
| Ethylene Carbonate | 0 | 4 | 2 | 0 |
| Toluene Diisocyanate | | | | |
| Index | 110 | 110 | 110 | 110 |
| Discoloration Value* | 50.0 | 43.1 | 44.0 | 42.8 |

*After microwave treatment for 6.5 minutes at 30% power

EXAMPLE 9

80 parts of a 48 hydroxyl number polyester polyol and 20 parts of a 43 hydroxyl number polyester polyol (multrathane R-16) is mixed with 3.2 parts water, 0.6 parts diethanolamine, 2.4 parts of a 43 hydroxyl number triol cell opener, 0.84 g. of silicon surfactant "L-5750", 9.6 parts of difluorodichloromethane blowing agent, 2.8 parts water and 1.12 g. of a tertiary amine catalyst mixture consisting of triethylenediamine and bis(2-dimethylaminoethyl) ether in an 8 to 1 ratio. To this stirred mixture was added 57.6 parts of diphenylmethane diisocyanate (MDI) with 25% 2,4' isomer and 75% 4,4' isomer containing a 32% NCO value. Flexible polyurethane foams prepared from this formulation showed decreased scorch and discoloration on the addition of 4 parts propylene carbonate.

What is claimed is:

1. A method for the preparation of a scorch and discoloration stabilized fire retarded flexible polyurethane foam which comprises reacting an organic di- or polyisocyanate with a polyester polyol having a hydroxyl number of about 25 to 75 and a functionality of 2 to 3 in the presence of a fire retardant compound, a polyalkylene oxide siloxane block copolymer surfactant, a tertiary amine or organic metal salt catalyst, a blowing agent selected from the group consisting of water which reacts with the di- or polyisocyanate to generate carbon dioxide and fluorocarbons having a boiling point below 60° C. mixed with water and methylene chloride mixed with water and from about 1 to about 12 parts by weight based on the polyester polyol of a cyclic alkylene carbonate of the formula

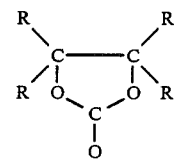

wherein R is independently hydrogen, an alkyl group having from 1 to 8 carbon atoms, an alkenyl group having from 1 to 8 carbon atoms or a phenyl group.

2. A method according to claim 1 wherein the di- or polyisocyanate is a mixture of toluene 2,4- and toluene 2,6-diisocyanates.

3. A method according to claim 1 wherein the di- or polyisocyanate is diphenylmethane diisocyanate.

4. A method according to claim 1 wherein the flame retardant compound is a halogenated alkyl phosphate ester.

5. A method according to claim 4 wherein the flame retardant is tetrakis (2-chloroethyl) ethylene diphosphate.

6. A method according to claim 4 wherein the flame retardant is tetrakis [2-chloroethyl] bis-2(2 chloromethyl) propylene diphosphate or oligomers thereof.

7. A method according to claim 1 wherein the tertiary amine catalyst is n-methyl morpholine.

8. A method according to claim 1 wherein the organic metal salt is dibutyl tin dilaurate.

9. A method according to claim 1 wherein the cyclic alkylene carbonate is selected from the group consisting of ethylene carbonate, propylene carbonate and mixtures thereof.

10. A method according to claim 9 wherein the cyclic alkylene carbonate is propylene carbonate.

11. A method for the preparation of a scorch and discoloration stabilized fire retardant flexible polyurethane foam which comprises reacting a mixture of 2,4'- and 2,6' toluene diisocyanate with a polyester polyol having a hydroyl number of about 25 to 75 and a functionality of 2 to 3 in the presence of a halogenated alkyl phosphate ester fire retardant compound, a polyalkylene oxide siloxane block copolymer surfactant, an n-methyl morpholine catalyst, dibutyl tin dilaurate catalyst, water and from about 2 to about 6 parts by weight propylene carbonate based on the weight of the polyester polyol.

* * * * *